US010256889B2

(12) United States Patent
Nyenhuis

(10) Patent No.: US 10,256,889 B2
(45) Date of Patent: Apr. 9, 2019

(54) METHOD AND DEVICE FOR CONDITIONING A RADIO DATA SIGNAL FOR A BROADCAST RECEIVER

(71) Applicant: Robert Bosch GmbH, Stuttgart (DE)

(72) Inventor: Detlev Nyenhuis, Sibbesse (DE)

(73) Assignee: ROBERT BOSCH GMBH, Stuttgart (DE)

( * ) Notice: Subject to any disclaimer, the term of this patent is extended or adjusted under 35 U.S.C. 154(b) by 188 days.

(21) Appl. No.: 15/128,474

(22) PCT Filed: Feb. 2, 2015

(86) PCT No.: PCT/EP2015/052052
§ 371 (c)(1),
(2) Date: Sep. 23, 2016

(87) PCT Pub. No.: WO2015/144344
PCT Pub. Date: Oct. 1, 2015

(65) Prior Publication Data
US 2017/0111097 A1    Apr. 20, 2017

(30) Foreign Application Priority Data
Mar. 25, 2014    (DE) .................. 10 2014 205 528

(51) Int. Cl.
*H04B 7/06* (2006.01)
*H04H 40/18* (2008.01)
(Continued)

(52) U.S. Cl.
CPC .......... *H04B 7/0632* (2013.01); *H04H 40/18* (2013.01); *H04L 43/16* (2013.01); *H04H 2201/13* (2013.01); *H04L 27/2273* (2013.01)

(58) Field of Classification Search
CPC .... H04H 2201/13; H04H 40/18; H04H 20/34; H04L 2027/0046; H04L 27/2332;
(Continued)

(56) References Cited

U.S. PATENT DOCUMENTS 5,507,024 A * 4/1996 Richards, Jr. .......... H04H 40/54
381/4
5,726,992 A * 3/1998 Roither .................. H04H 20/02
714/704
(Continued)

FOREIGN PATENT DOCUMENTS

EP    0627833 A1    12/1994
EP    0627834 A1    12/1994
(Continued)

OTHER PUBLICATIONS

International Search Report dated May 13, 2015, of the corresponding International Application PCT/EP/2015/052052, filed on Feb. 2, 2015.
(Continued)

*Primary Examiner* — Awet Haile
(74) *Attorney, Agent, or Firm* — Norton Rose Fulbright US LLP; Gerard Messina

(57) ABSTRACT

A method includes a step of reading in the radio data signal and a radio data clock signal, a step of integrating a signal that is a function of the radio data signal and/or the radio data clock signal in order to determine an integral value curve, a step of decoding radio data signal information from the integral value curve, using the radio data clock signal and/or a phase position of the radio data signal, a step of ascertaining radio data signal quality information which represents the credibility of the decoded radio data signal information, using the radio data signal and/or the phase position of the radio data signal, and a step of providing the radio data
(Continued)

signal information and the radio data signal quality information in order to provide a conditioned radio data signal.

8 Claims, 8 Drawing Sheets

(51) Int. Cl.
*H04L 12/26* (2006.01)
*H04L 27/227* (2006.01)

(58) Field of Classification Search
CPC ... H04L 25/4904; H04L 25/06; H04L 25/491; H04L 27/2273; H04L 43/16; H04L 7/0334; H03L 2207/14; H03L 7/091; H04B 7/0632
See application file for complete search history.

(56) References Cited

U.S. PATENT DOCUMENTS

| | | | |
|---|---|---|---|
| 5,777,511 A * | 7/1998 | Masumoto | H04H 40/18 329/304 |
| 5,901,188 A * | 5/1999 | Roither | H04L 7/033 327/12 |
| 2002/0126771 A1 * | 9/2002 | Li | H03D 7/166 375/324 |
| 2006/0125692 A1 * | 6/2006 | Wang | G01S 5/0252 342/451 |
| 2009/0175385 A1 * | 7/2009 | Tsai | H04H 40/18 375/326 |

FOREIGN PATENT DOCUMENTS

| | | |
|---|---|---|
| EP | 0803999 A2 | 10/1997 |
| JP | 2006304092 A | 11/2006 |

OTHER PUBLICATIONS

Schneegass, Lutz "Universal digital tuning and display system with RDS", J.radio fernsehen elektronik (Berlin)40, No. 5 (1991), pp. 257-264.

* cited by examiner

METHOD AND DEVICE FOR CONDITIONING A RADIO DATA SIGNAL FOR A BROADCAST RECEIVER

FIELD

The present invention relates to a method for conditioning a radio data signal for a broadcast receiver, a corresponding device for conditioning a radio data signal for a broadcast receiver, and a corresponding computer program product.

BACKGROUND INFORMATION

The radio data system (RDS) has existed since the late 1980s. Over the years, continual improvements have been made in the field of RDS demodulation and RDS decoding in the receiver. The services of the RDS are certain types of data which may be transmitted, and evaluated by the radio receivers according to the type of data. In addition to the widely used functions for program identification, radio traffic service, and alternative frequencies, RDS provides further options for additional information/services. RDS is modulated to 57 kHz, with suppression of the carrier. A digital two-phase shift keying method (2-PSK) is used as the modulation method.

European Patent Application No. EP 0627834 A1 describes a circuit system for a demodulator of a radio data signal in a broadcast receiver.

SUMMARY

Against this background, a method for conditioning a radio data signal for a broadcast receiver, a device for conditioning a radio data signal for a broadcast receiver which uses this method, and lastly, a corresponding computer program product according to the present invention are provided. Advantageous embodiments result from the description below.

For each bit of the digital radio data signal, the credibility or security (quality) may be determined, in that the bit received in a receiver corresponds to the bit transmitted by a transmitter. The information concerning the credibility, in addition to the check bits, may allow an improvement in the RDS sensitivity or the RDS data recognition at the bit level in the check bits transmitted via the radio data signal.

A method for conditioning a radio data signal for a broadcast receiver includes the following steps:

reading in the radio data signal and a radio data clock signal;

integrating a signal that is a function of the radio data signal and/or the radio data clock signal in order to determine an integral value curve;

decoding radio data signal information from the integral value curve, using the radio data clock signal and/or a phase position of the radio data signal;

ascertaining radio data signal quality information which represents radio data signal quality, using the radio data signal and/or the phase position of the radio data signal, the radio data signal quality information representing the credibility (quality) of the decoded radio data signal information; and providing the radio data signal information and the radio data signal quality information in order to provide a conditioned radio data signal.

A radio data signal may be understood to mean a radio data system signal or an RDS signal. The radio data signal may be transmitted via ultra short wave (USW) and modulated to a frequency-modulated (FM) signal. The radio data clock signal may be obtained using the FM signal or using the radio data signal. The radio data signal may be present in digital form as a multiplex (MPX) signal. The radio data signal may be digitized by an analog/digital (A/D) converter.

Thus, the two signals may be stored in a memory or a register and read out. Sample values of the dependent signal or of an auxiliary signal may be summed in the step of integrating. Sample values may be summed over a time period or a time interval in the step of integrating. In the step of decoding, the radio data signal information may be understood to mean a radio data signal bit or an RDS bit. The radio data signal information may be present as a binary value or as a binary data word. In a 2-PSK method, bits, i.e., "ones" and "zeroes," are transmitted in the data clock pulse (for RDS, 1187.5 Hz). The radio data signal quality information may be understood to mean quality information. The radio data signal quality information may be present as a binary value or as a binary data word. The credibility of the decoded radio data signal information may be used to describe the likelihood that associated radio data signal information has been correctly received, or the likelihood that transmitted radio data signal information has been correctly or incorrectly received. If the radio data signal information is provided together with the radio data signal quality information, for one or multiple bits or portions of information a credibility may be associated with the radio data signal information, and this information may be utilized for improved error correction or as an indication of reliability or credibility of the received data. The transmission or the conditioning of the radio data signal may be advantageously improved in this way.

The integral value over the duration of a period of the radio data signal clock pulse may be determined in the step of determining. In one specific embodiment, the integral value may be determined in the step of determining by multiplying the radio data signal by the sine of the radio data signal. The demodulation of the RDS signal may be advantageously improved in this way.

In addition, in the step of ascertaining, the radio data signal quality information may represent a good quality when the integral value of the radio data signal is below a predefined threshold value. The RDS quality information may represent a poor quality when the integral value of the radio data signal is above the predefined threshold value. A good quality may represent a high credibility. In particular, the radio data signal quality information may have the value zero when the radio data signal quality information represents a good quality. In particular, the radio data signal quality information may have a value different from zero when the radio data signal quality information represents a poor quality. In particular, the radio data signal quality information may have the value one (i.e., a "1") when the radio data signal quality information represents a poor quality. A bit of the radio data signal quality information may be associated with a bit of the radio data signal information. The radio data signal quality information may thus be associated bit by bit with the radio data signal information.

The phase position of the radio data signal may be divided into a first phase having a phase angle of 0°, and a second phase having a phase angle of 180°, in the step of decoding. The first phase and the second phase may be differentiated by applying a signum function to the radio data clock signal, since this is a carrierless transmission.

It is also advantageous when the radio data signal information is decoded in the step of decoding, using a sine component of the radio data signal, and additionally or alternatively a cosine component of the radio data signal, and additionally or alternatively using the radio data signal.

In addition, the radio data clock signal may be obtained by applying a Costas loop to the radio data signal (at the clock pulse level 1187.5 Hz).

Using the Costas loop, a phase position of the radio data signal, or the radio data clock signal, may be reconstructed from the radio data signal or a bit stream of the radio data signal.

A multiplex signal may be read in the step of reading in. A multiplex signal may be understood to mean a digitized MPX signal. By use of the multiplex signal, a 19-kHz pilot tone may be reconstructed, using a 19-kHz phase-locked loop. A 57-kHz radio data carrier signal may be generated in response to the 19-kHz pilot tone. The 57-kHz radio data carrier signal may be mixed with the multiplex signal. The 57-kHz radio data carrier signal which is mixed with the multiplex signal may be converted into a baseband in order to provide the RDS signal.

In accordance with the present invention, a device is provided which is designed to carry out or implement the steps of one variant of a method provided here, in appropriate units. The object underlying the present invention may also be quickly and efficiently achieved by this embodiment variant of the present invention in the form of a device.

In the present context, a device may be understood to mean an electrical device or a circuit which processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated, integrated circuits, or to be at least partially made up of discrete components. In a software design, the interfaces may be software modules which are present on a microcontroller or DSP, for example, in addition to other software modules.

Also advantageous is a computer program product including program code which may be stored on a machine-readable carrier such as a semiconductor memory, a hard disk, or an optical memory, and used for carrying out the method according to one of the specific embodiments described above, when the program product is executed on a computer DSP, a microcontroller (μC), or a device.

The present invention is explained in greater detail below by way of example, with reference to the figures.

DETAILED DESCRIPTION OF EXAMPLE EMBODIMENTS

Figure 1:
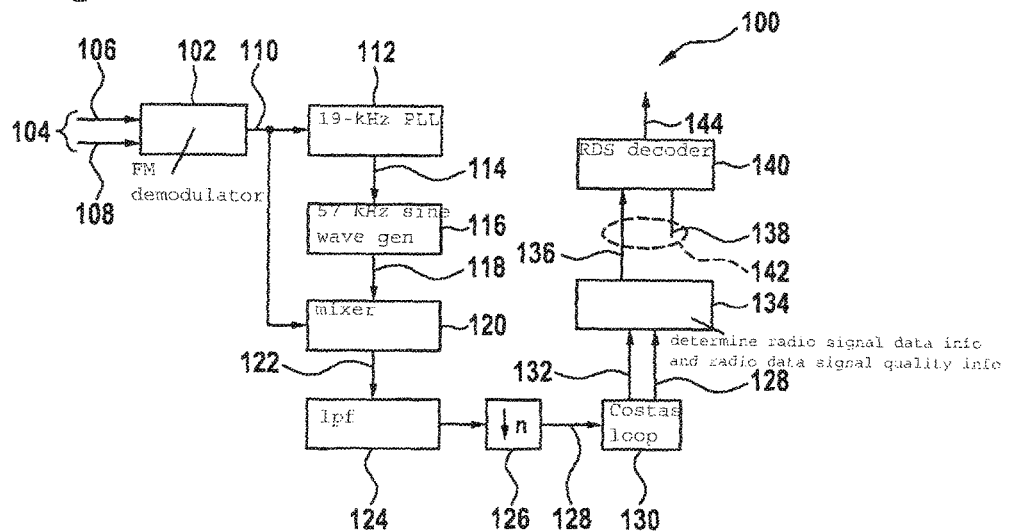
FIG. 1 shows a block diagram of a demodulator for a radio data signal according to one exemplary embodiment of the present invention.

In the following description of advantageous exemplary embodiments of the present invention, identical or similar reference numerals are used for the elements having a similar action which are illustrated in the various figures, and a repeated description of these elements is dispensed with.

FIG. 1 shows a block diagram of a demodulator 100 for a radio data signal according to one exemplary embodiment of the present invention. An FM demodulator 102 is supplied with an intermediate frequency signal 104 as an I signal 106, and a Q signal 108 which is an in-phase signal and quadrature signal for I signal 106. FM demodulator 102 provides a multiplex signal 110 or MPX signal 110. Multiplex signal 110 contains in addition to audio information a radio data signal or both signals, depending on the receiving transmitter. The RDS signal is spectrally situated at 57 kHz. In order to transmit the radio data signal, phase shift keying of a suppressed auxiliary carrier takes place at the generally emitted frequency of 1187.5 Hz. A block 112 represents a 19-kHz phase-locked loop or 19-kHz PLL. Multiplex signal 110 is present at the input of the 19-kHz phase-locked loop, and a 19-kHz pilot tone 114 is provided at the output. 19-kHz pilot tone 114 is present at an input of block 116. Block 116 represents a 57-kHz sine wave generation, using 19-kHz pilot tone 114. 57 kHz corresponds to three times the frequency of 19-kHz pilot tone 114. 57-kHz sine wave 118, also referred to as 57-kHz wave 118 for simplicity, which is provided by block 116 is provided to a block 120 which is designed for mixing 57-kHz sine wave 118 with multiplex signal 110 provided by FM demodulator 102, and providing same as auxiliary signal 122. Auxiliary signal 122 is transmitted to a block 124, which represents a low pass or a low pass filter, and is filtered there, and is subsequently supplied to block 126. Subsampling or a sampling rate reduction by a factor n takes place in block 126. RDS signal 128, also referred to as radio data signal 128, which is provided by block 126 is transmitted to a Costas loop 130, which transmits a radio data clock signal 132 and looped-through RDS signal 128 to subsequent block 134. Radio data clock signal 132 is also referred to as an RDS clock pulse or an RDS clock signal. Block 134 represents a circuit which, using RDS signal 128 and radio data clock signal 132, determines radio data signal information 136 and radio data signal quality information 138, which are transmitted to an RDS decoder 140 as conditioned radio data signal 142, whereby RDS decoder 140 obtains RDS block data 144 from this information.

The exemplary embodiment illustrated in FIG. 1 shows an RDS demodulator with improved RDS sensitivity. In mobile reception situations, the reception field strength fluctuates very strongly, and RDS signal 128 often disappears; i.e., the RDS reception is interrupted. To ensure stable RDS reception, it is important to continually increase the RDS sensitivity. Nowadays, many applications are dependent on stable RDS reception, for example the TMC signal, which transmits traffic updates that are necessary in a navigation unit for computing the route. Over the long term, loss of information may result in errors. In addition, the up-to-dateness and stability of the FM transmitter list is greatly dependent on the RDS sensitivity.

Improving the RDS sensitivity thus results in many advantages, which will be described by the use of novel algorithms.

One aspect of the provided exemplary embodiment is an improvement in the RDS sensitivity. 57-kHz wave (PLL) 118 is generated from 19-kHz pilot tone (PLL) 114. The stereo pilot tone is generated at 19 kHz in the transmitter. The 57-kHz wave for the RDS signal is also obtained in the transmitter, from the 19-kHz pilot tone wave. Conversely, in the receiver the 57-kHz wave 118 for the RDS signal may also be recovered from 19-kHz pilot tone frequency 114. Pilot tone 114 is emitted by the transmitter at an approximately 7.5 kHz stroke (approximately 10% of the total power), and may be easily reconstructed in the receiver via a 19-kHz PLL 112. The transmitted pilot tone is much more stable, even in the event of interference, than the likewise transmitted 57-kHz RDS signal with a typical 1.5-2.5-kHz stroke.

This 19-kHz wave 114 is now synchronized in frequency and phase with the 19 kHz in the transmitter, and the 57-kHz wave 118 for the RDS signal is then generated from it. MPX signal 110 is mixed with this 57-kHz wave 118, and the RDS signal is converted into the baseband (at a frequency of zero). A subsequent Costas loop 130 then takes over the RDS sine generation at 1187.5 Hz. Costas loop 130 has improved RDS data recognition (on the bit level). In addition, the RDS quality computation, which further improves the RDS sensitivity, is optimized.

The pilot tone is emitted by the transmitter with amplitude A, i.e., A·sin(19 kHz+phi), and is then angle-modulated. The 19-kHz wave is recovered in the receiver via a PLL circuit, and phase error phi is corrected. Thus, sin(19 kHz+phi) is generated via a PLL circuit. The 57-kHz wave is obtained from this 19-kHz sine by applying the equation 4·sin(19 kHz+phi)$^3$+3·sin(19 kHz+phi)=sin(57 kHz+3·phi), and is mixed with MPX signal 110. RDS signal 128 is thus generated in the baseband. In addition, the 19 kHz is emitted by the transmitter at approximately 10% of the total power, i.e., with a 7.5-kHz stroke, compared to the 1.5-2.5 kHz that is available for the RDS signal at 57 kHz. In addition, the pilot tone has no directly adjacent frequencies; i.e., only the pilot tone is present between 15 kHz and 23 kHz. Thus, with the pilot tone a much better (more stable) 57-kHz wave may be generated, and the RDS sensitivity may be significantly improved. It is thus also possible, for example, to have reception from RDS transmitters situated far away. This advantageously results in better TMC reception, which may be utilized for navigation.

It is advantageous that no direct 57-kHz PLL is utilized for generating the 57-kHz wave in the receiver; instead, the 19-kHz PLL is utilized for generating the 57-kHz wave.

Figure 2:
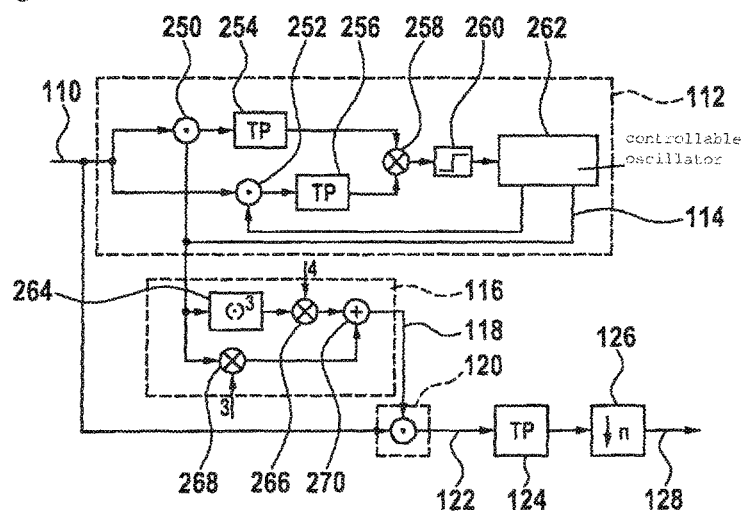
FIG. 2 shows a block diagram of a portion of a demodulator for a radio data signal according to one exemplary embodiment of the present invention.

FIG. 2 shows a block diagram of a portion of a demodulator for a radio data signal 128 according to one exemplary embodiment of the present invention. The block diagram shown in FIG. 2 may be a detail of the block diagram of a demodulator 100 for a radio data signal shown and described in FIG. 1. A multiplex signal 110 is supplied to a 19-kHz phase-locked loop 112. An input of a first multiplier 250 and an input of a second multiplier 252 are connected to multiplex signal 110. First multiplier 250 is connected to a first low pass filter 254, and second multiplier 252 is connected to a second low pass filter 256. First low pass filter 254 and second low pass filter 256 are connected to a multiplier 258, whose output signal is connected to a signum formation 260. An output of signum formation 260 is connected to a controllable oscillator 262. Controllable oscillator 262 may also be referred to as a sine generator and/or cosine generator. An output of controllable oscillator 262 is connected to the input of block 116 of the 57-kHz generation from 19-kHz pilot tone 114, and to first comparator 250. Another output of controllable oscillator 262 is connected to second multiplier 252. 19-kHz pilot tone 114 may be described mathematically as sin(19 kHz+phi).

The input of block 116 is connected to a block 264. Block 264 determines the cube of an applied signal. The output of block 264 is connected to a multiplier 266 which is designed for multiplying an applied signal by a factor of four. The input of block 116 is also connected to a multiplier 268 which is designed for multiplying an applied signal by a factor of three. The output of multiplier 266 and the output of multiplier 268 are connected to an adder 270 which is designed for adding two applied signals. An output of adder 270, as the output of block 116 as a 57-kHz sine wave 118, is connected to block 120, block 120 being designed for mixing 57-kHz wave 118 with multiplexer signal 110 and providing same as an auxiliary signal 122. Block 120 is connected to a low pass filter 124. Low pass filter 124 is connected to a block 126. Subsampling or a sampling rate reduction by a factor n takes place in block 126. Block 126 provides an RDS signal 128.

Figure 3:
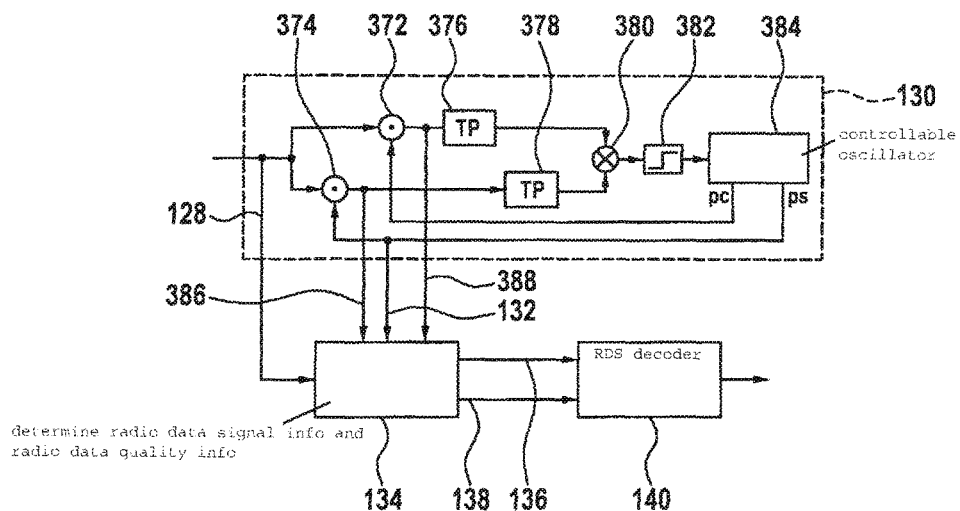
FIG. 3 shows a block diagram of a demodulator for a radio data signal with a detail of a Costas loop according to one exemplary embodiment of the present invention.

FIG. 3 shows a block diagram of a portion of a demodulator for a radio data signal 128 with a detail of a Costas loop 130 according to one exemplary embodiment of the present invention. The block diagram shown in FIG. 3 may be a detail of the block diagram of a demodulator 100 for a radio data signal shown and described in FIG. 1. Block 130, which represents a Costas loop, is described in greater detail. An RDS signal 128 is supplied to Costas loop 130. An input of a first multiplier 372 and an input of a second multiplier 374 are connected to RDS signal 128. First multiplier 372 is connected to a first low pass filter 376, and second multiplier 374 is connected to a second low pass filter 378. First low pass filter 376 and second low pass filter 378 are connected to a multiplier 380, whose output signal is connected to a signum formation 382. An output of signum formation 382 is connected to a controllable oscillator 384. Controllable oscillator 384 may also be referred to as a sine generator and/or cosine generator. A first output of controllable oscillator 374 at which radio data clock signal 132 is present is connected to the input of block 134 and to second multiplier 374. A second output of controllable oscillator 384 is connected to first multiplier 372. The output of second multiplier 374 is provided as a sine component 386 to block 134. The output of first multiplier 372 is provided as a cosine component 388 to block 134. In addition, block 134 is connected to RDS signal 128, which is looped past Costas loop 130. Block 134 provides radio data signal information 136 to a first output, and radio data signal quality information 138 to a second output. Block 134 represents a method which uses RDS signal 128, radio data clock signal 132, sine component 386, and cosine component 388 to determine radio data signal information 136 and radio data signal quality information 138. Block 134 is connected to block 140.

In one exemplary embodiment, Costas loop 130 as a core component is made up of a numerically controlled oscillator 384, a signum formation 382, multiple multipliers 372, 374, 380, and two low pass filters 376, 378. When the phase position of numerically controlled oscillator 384 is correctly set, the control signal via the toggles the signal from 382 between +1 and −1. If a clock pulse deviation occurs, this is corrected by the control loop (Costas loop 130).

Figure 4:
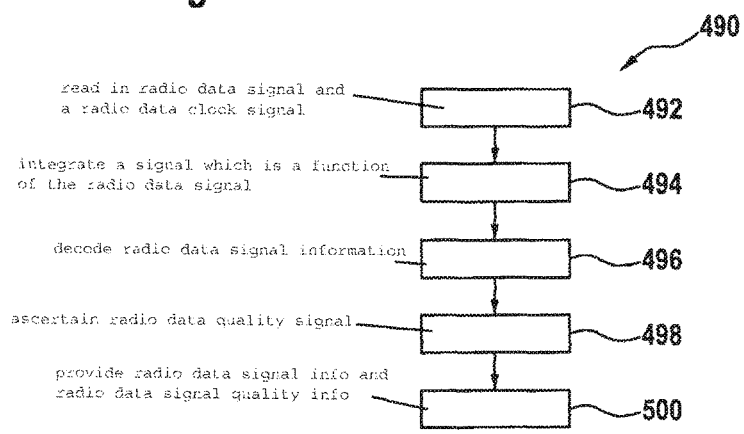
FIG. 4 shows a flow chart of a method for conditioning a radio data signal for a broadcast receiver according to one exemplary embodiment of the present invention.

FIG. 4 shows a flow chart of a method 490 for conditioning a radio data signal for a broadcast receiver according to one exemplary embodiment of the present invention. Method 490 for conditioning a radio data signal for a broadcast receiver includes a step 492 of reading in the radio data signal and a radio data clock signal, a step 494 of integrating a signal which is a function of the radio data signal, and at the same time or alternatively is a function of the radio data clock signal, in order to determine an integral value curve, a step 496 of decoding radio data signal information from the integral value curve, using the radio data clock signal and additionally or alternatively a phase position of the radio data signal, a step 498 of ascertaining radio data signal quality information which represents radio data signal quality, using the radio data signal and additionally or alternatively, the phase position of the radio data signal, and a step 500 of providing the radio data signal information and the radio data signal quality information in order to provide a conditioned radio data signal. The radio data signal quality information represents the credibility of the decoded radio data signal information.

In one exemplary embodiment, the integral value is determined over a period of the radio data signal clock pulse in step 494 of integrating. The integral value is determined by multiplying the radio data signal by the sine of the radio data signal.

In one exemplary embodiment, the radio data signal quality information in step 498 of ascertaining represents a good quality when the integral value of the radio data signal is below a predefined threshold value. The RDS quality information represents a poor quality when the integral value of the radio data signal is above the predefined threshold value. A good quality represents high credibility. In one exemplary embodiment, the radio data signal quality information has the value zero when the radio data signal quality information represents a good quality. The radio data signal quality information has a logical 1 when it represents a poor quality.

In one exemplary embodiment, the phase position of the radio data signal is divided into a first phase having a phase angle of 0°, and a second phase having a phase angle of 180°, in step 496 of decoding. The first phase and the second phase are differentiated by applying a signum function to the radio data clock signal.

In one exemplary embodiment, the radio data signal information is decoded in step 496 of decoding, using a sine component of the radio data signal, and additionally or alternatively a cosine component of the radio data signal, and additionally or alternatively using the radio data signal.

In one exemplary embodiment, the radio data clock signal is obtained in step 492 by applying a Costas loop to the radio data signal.

In one exemplary embodiment, a multiplex signal is read in in step 492, a 19-kHz pilot tone being reconstructed using the multiplex signal, using a 19-kHz phase-locked loop, a 57-kHz radio data carrier signal being generated in response to the 19-kHz pilot tone, and the 57-kHz radio data carrier signal being mixed with the multiplex signal and converted into a baseband in order to provide the RDS signal.

In one exemplary embodiment, the radio data signal is filtered in step 492 of reading in, using a low pass filter, before the radio data signal is provided. Subsampling with a predefined sampling factor takes place in a substep.

Figure 5:
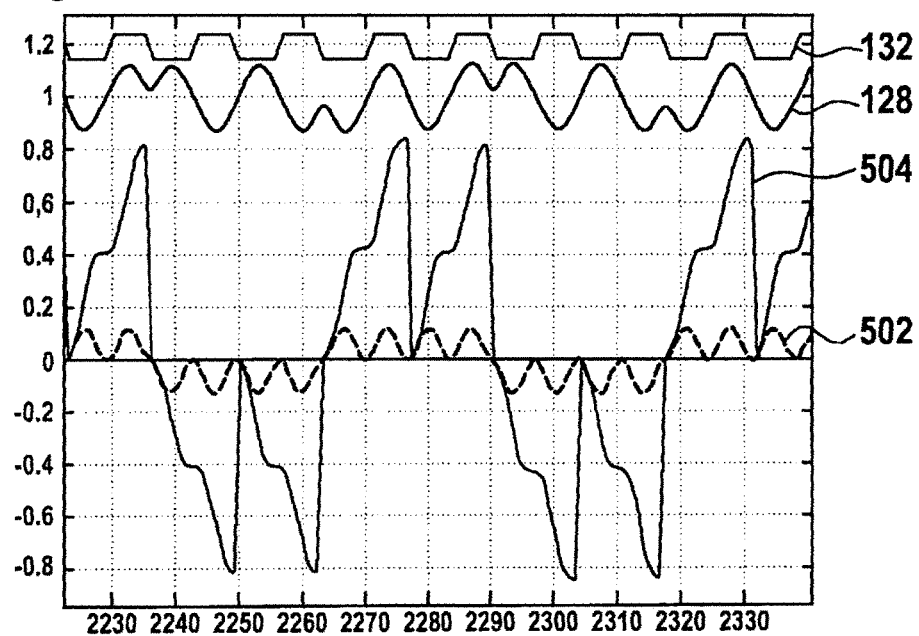
FIG. 5 shows a signal pattern of a radio data signal and auxiliary signals during the decoding according to one exemplary embodiment of the present invention.

FIG. 5 shows a signal pattern of a radio data signal and auxiliary signals during the decoding according to one exemplary embodiment of the present invention. Four signal patterns 132, 128, 504, 502 are illustrated in a Cartesian coordinate system. The abscissa represents a time axis. The ordinate represents an amplitude of the signal patterns. Signal pattern 132 indicates a radio data clock signal 132. Signal pattern 128 indicates a radio data signal 128. Signal pattern 502 indicates a signal corresponding to +sin(ωt)·sin(ωt). Signal pattern 504 indicates a signal corresponding to an integral of radio data signal 128 multiplied by a sine, the integral value being set to zero after an RDS clock pulse. This means that an integration takes place over one period of radio data clock signal 132.

Radio data clock signal 132 corresponds approximately to a rectangular-pulse signal, and is the signum of the RDS sine (1187.5 Hz). Radio data clock signal 132 ranges about a value of 1.2 on the ordinate of the Cartesian coordinate system (radio data clock signal 132 is shifted solely for appearance for purposes of illustration in a graphical plot, and has no technical relevance). Signal pattern 128 oscillates about a value on the ordinate (the same as for radio data clock signal 132, this is only scaling for better readability). A half-wave of signal pattern 502 corresponds to one-half period of radio data clock signal 132.

An evaluation of signal pattern 504 always takes place at the end of an RDS clock pulse 132. In the exemplary embodiment shown, this results in a pattern 101010.

Figure 6:
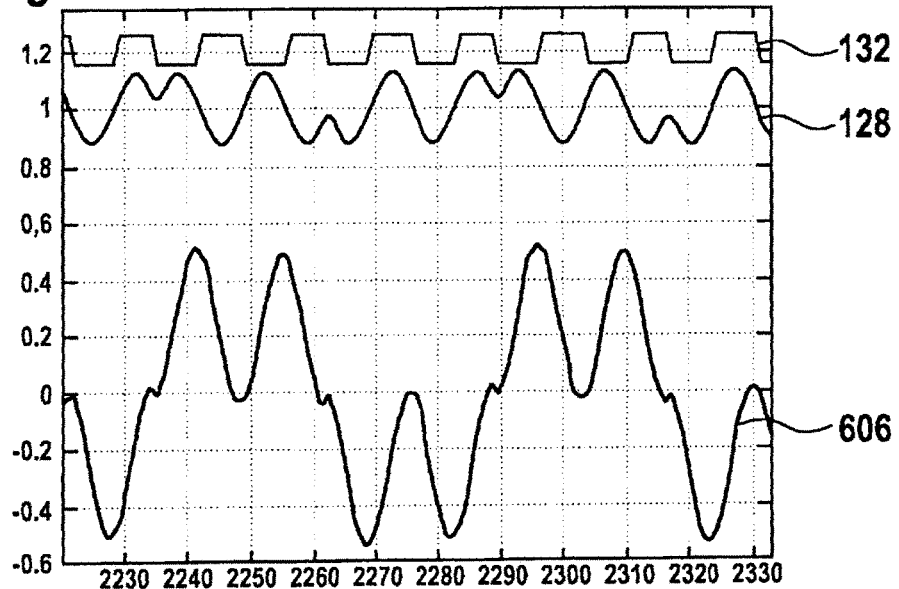
FIG. 6 shows a signal pattern of a radio data signal and auxiliary signals during the decoding according to one exemplary embodiment of the present invention.

FIG. 6 shows a signal pattern of a radio data signal 128 and of auxiliary signals in the decoding according to one exemplary embodiment of the present invention. Three signal patterns 132, 128, 606 are illustrated in a Cartesian coordinate system. The abscissa represents a time axis. The signal patterns are shifted on the ordinate for purposes of illustration. Signal pattern 132 indicates a radio data clock signal 132. Signal pattern 128 indicates a radio data signal 128. Signal pattern 606 indicates a signal of a summation of a quality signal. Signal pattern 128, i.e., radio data signal 128, and signal pattern 132, i.e., radio data clock signal 132, correspond to the illustration in FIG. 5. Signal 606 represents a summation over time of a signal which represents quality.

Figure 7:
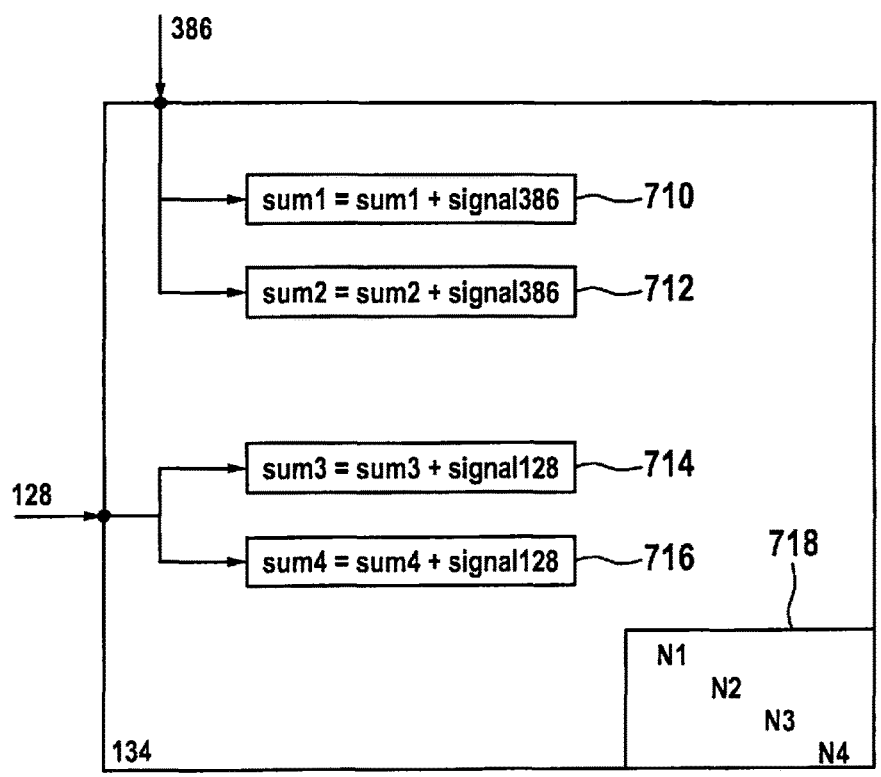
FIG. 7 shows a block diagram of a portion of the block diagram of the demodulator according to one exemplary embodiment of the present invention.

FIG. 7 shows a block diagram of a portion of block 134 according to one exemplary embodiment of the present invention. The block diagram may be a flow chart which is implemented as a computer program product or as a circuit. Block 134 may be an exemplary embodiment of block 134 shown in FIG. 1 or FIG. 3. Block 134 is supplied with a radio data signal 128 and a sine component 386. Sine component 386 is supplied to blocks 710 and 712, and radio data signal 128 is supplied to blocks 714 and 716. A variable sum1 is incremented by the value of sine component 386 in block 710; i.e., a sum is formed from variable sum1 and sine component 386 and stored as the new value for variable sum1. A variable sum2 is incremented by the value of sine component 386 in block 712; i.e., a sum is formed from variable sum2 and sine component 386 and stored as the new value for variable sum2. A variable sum3 is incremented by the value of radio data signal 128 in block 714; i.e., a sum is formed from variable sum3 and radio data signal 128 and stored as the new value for variable sum3. A variable sum4 is incremented by the value of radio data signal 128 in block 716; i.e., a sum is formed from variable sum4 and radio data signal 128 and stored as the new value for variable sum4. A block 718 situated in block 134 represents the partial segments of block 134 illustrated in subsequent FIG. 8 through FIG. 11.

Figure 8:
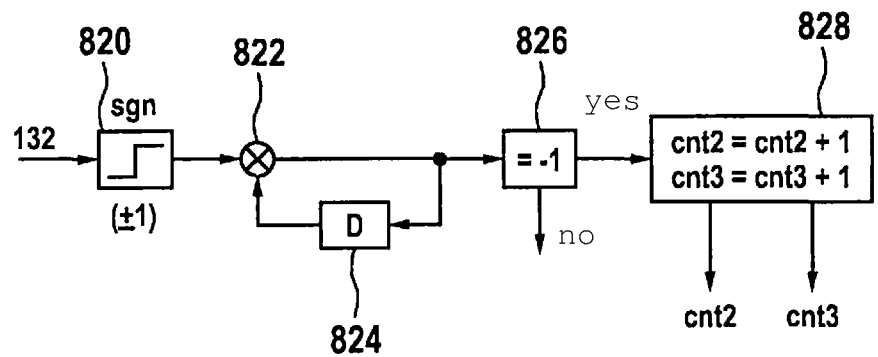
FIG. 8 shows a block diagram of a portion of the block diagram of the demodulator according to one exemplary embodiment of the present invention.

FIG. 8 shows a block diagram of a portion of block 134 according to one exemplary embodiment of the present invention. The block diagram may be a flow chart which is implemented as a computer program product or as a circuit. Block 134 may be an exemplary embodiment of block 134 shown in FIG. 1 or FIG. 3. Block 134 is supplied with a radio data clock signal 132. A signum function is applied to radio data clock signal 132 in a block 820. The result of the signum function in block 820 is multiplied by a result of the multiplication that is returned via a D block 824, in subsequent multiplier 822. The result of multiplication 822 is checked in block 826 for agreement with the value minus one ("−1"), and when there is a positive match, a variable cnt2 is incremented by the value one in a subsequent block 828; i.e., a sum is formed from variable cnt2 and value "+1" and stored as the new value for variable cnt2. In addition, when there is a positive match in block 828, a variable cnt3 is incremented by the value one; i.e., a sum is formed from variable cnt3 and value "+1" and stored as the new value for variable cnt3.

Figure 9:
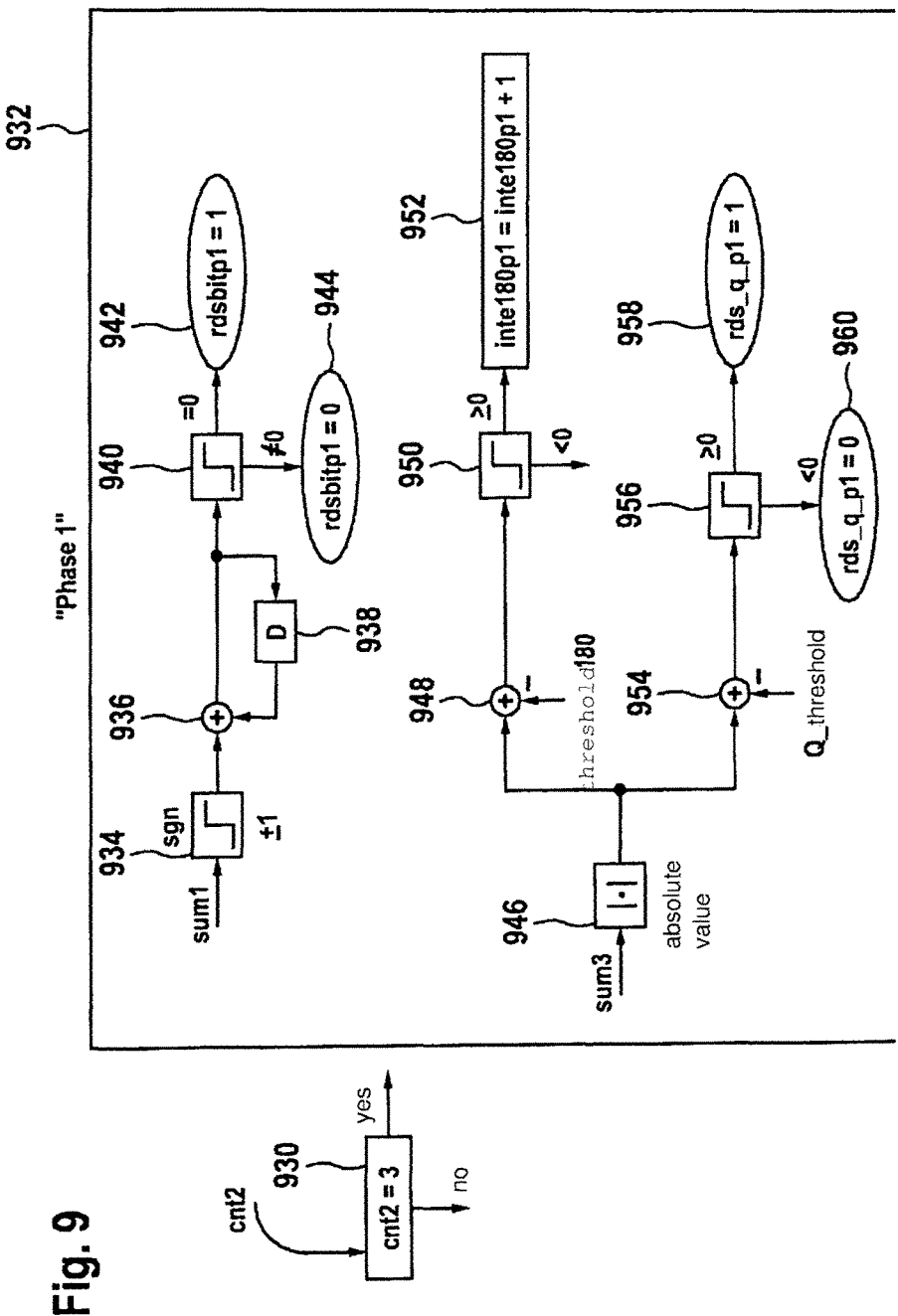
FIG. 9 shows a block diagram of a portion of the block diagram of the demodulator according to one exemplary embodiment of the present invention.

FIG. 9 shows a block diagram of a portion of block 134 according to one exemplary embodiment of the present invention. The block diagram may be a flow chart which is implemented as a computer program product or as a circuit. Block 134 may be an exemplary embodiment of block 134 shown in FIG. 1 or FIG. 3. A decision block 930 is supplied with a signal cnt2 or a variable cnt2, as defined in FIG. 8 in block 828. When variable cnt2 has the value three, a block 932 is executed. Blocks 934 through 960 are part of block 932. In a block 934, a signum function is applied to variable sum1 defined in block 710, and in adder 936 the result is added to a result of adder 936 that is returned via a D block 938. The result of adder 936 is supplied to a block 940, in which a signum function is applied to the result of adder 936 and a comparison is then carried out. If the result of the comparison in block 940 is equal to zero, a variable rdsbitp1 is set to the value 1 in block 942. If the result of the comparison in block 940 is not equal to zero, variable rdsbitp1 is set to the value 0 in block 944. An absolute value of variable sum3 is formed in a block 946, and the result is supplied to an adder 948 and an adder 954. A signal or a variable threshold 180 is subtracted from the absolute value of variable sum3 in adder 948, and the result of adder 948 is routed to a block 950, in which a signum function is applied to the result of adder 948 and a comparison is then carried out. If the result of the comparison in block 950 is greater than or equal to zero, a variable inte180p1 is incremented, i.e., the value is increased by one, in block 952. A signal or a variable Q_threshold is subtracted from the absolute value of variable sum3 in adder 954, and the result of adder 954 is routed to a block 956, in which a signum function is applied to the result of adder 954 and a comparison is then carried out. If the result of the comparison in block 956 is greater than or equal to zero, a variable rds_q_p1 is set to the value 1 in block 958. If the result of the comparison in block 956 is less than zero, variable rds_q_p1 is set to the value 0 in block 960.

Following this procedure, i.e., after the evaluation, variables sum1, sum3 are set to the value zero and variable cnt2 is set to the value one.

Figure 10:
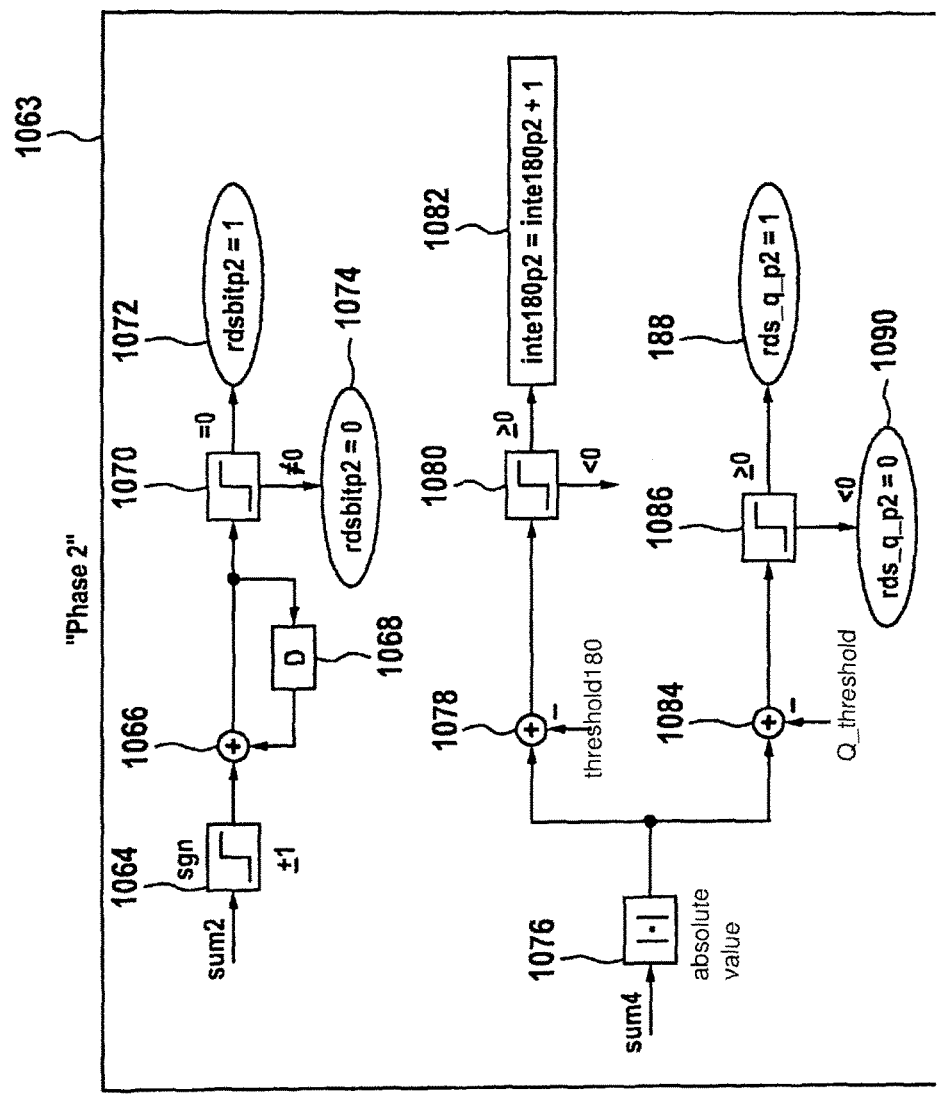
FIG. 10 shows a block diagram of a portion of the block diagram of the demodulator according to one exemplary embodiment of the present invention.

FIG. 10 shows a block diagram of a portion of block 134 according to one exemplary embodiment of the present invention. The block diagram may be a flow chart which is implemented as a computer program product or as a circuit. Block 134 may be an exemplary embodiment of block 134 shown in FIG. 1 or FIG. 3. FIG. 10 is structurally similar to FIG. 9, but in contrast to FIG. 9, in which block 932 represents a first phase, in FIG. 10 the second phase is processed. A decision block 1062 is supplied with a signal cnt3 or a variable cnt3, as defined in FIG. 8 in block 828. When variable cnt3 has the value four, a block 1063 is evaluated. Blocks 1064 through 1090 are part of block 1063. In a block 1064, a signum function is applied to variable sum2 defined in block 712, and in adder 1066 the result is added to a result of adder 1066 that is returned via a D block 1068. The result of adder 1066 is supplied to a block 1070, in which a signum function is applied to the result of adder 1066 and a comparison is then carried out. If the result of the comparison in block 1070 is equal to zero, a variable rdsbitp2 is set to the value 1 in block 1072. If the result of the comparison in block 1070 is not equal to zero, variable rdsbitp2 is set to the value 0 in block 1074. An absolute value of variable sum4 is formed in a block 1076, and the result is supplied to an adder 1078 and an adder 1084. A signal or a variable threshold 180 is subtracted from the absolute value of variable sum4 in adder 1078, and the result of adder 1078 is routed to a block 1080, in which a signum function is applied to the result of adder 1078 and a comparison is then carried out. If the result of the comparison in block 1080 is greater than or equal to zero, a variable inte180p2 is incremented, i.e., the value is increased by one, in block 1082. A signal or a variable Q_threshold is subtracted from the absolute value of variable sum4 in adder 1084, and the result of adder 1084 is routed to a block 1086, in which a signum function is applied to the result of adder 1084 and a comparison is then carried out. If the result of the comparison in block 1086 is greater than or equal to zero, a variable rds_q_p2 is set to the value 1 in block 1088. If the result of the comparison in block 1086 is less than zero, variable rds_q_p2 is set to the value 0 in block 1090.

Following this procedure, i.e., after the evaluation, variables sum2, sum4 are set to the value zero and variable cnt3 is set to the value two.

Figure 11:
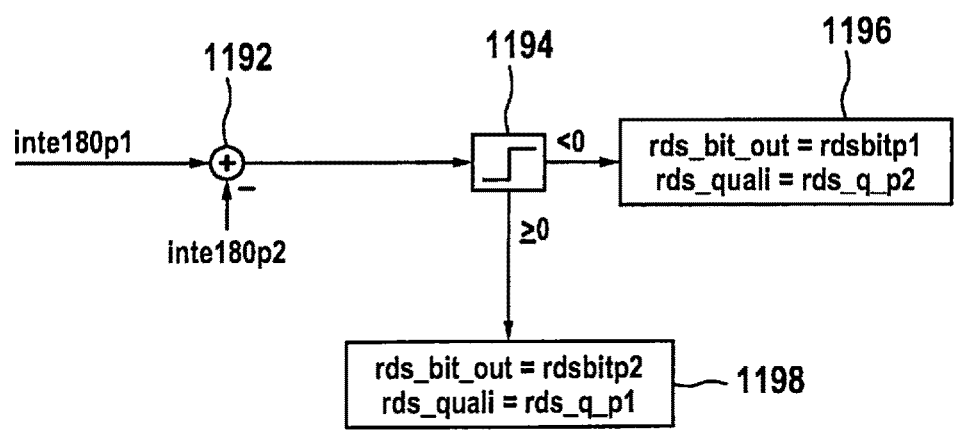
FIG. 11 shows a block diagram of a portion of the block diagram of the demodulator according to one exemplary embodiment of the present invention.

FIG. 11 shows a block diagram of a portion of block 134 according to one exemplary embodiment of the present invention. The block diagram may be a flow chart which is implemented as a computer program product or as a circuit. Block 134 may be an exemplary embodiment of block 134 shown in FIG. 1 or FIG. 3. An adder 1192 is supplied with the signals or variables inte180p1 and inte180p2, as introduced and defined in FIG. 9 and FIG. 10, respectively. The value of variable inte180p2 is subtracted from the value of variable inte180p1 in adder 1192, and the result is routed to a block 1194. A comparison is carried out in block 1194. If the result of the comparison in block 1194 is less than zero, the value of variable rdsbitp1 is assigned to a variable rds_bit_out, and the value of variable rds_q_p2 is assigned to a variable rds_quali, in block 1196. If the result of the comparison in block 1194 is greater than or equal to zero, the value of variable rdsbitp2 is assigned to variable rds_bit_out in block 1198, and the value of variable rds_q_p1 is assigned to variable rds_quali.

Thus, a decision is made in block 1194 concerning which of the two phases represents the correct phase for the RDS data and the RDS quality. Depending on the decision, the appropriate value is assigned to signals 136 and 138, as defined in FIG. 1 as radio data signal information 136 for variable rds_bit_out and radio data signal quality information 138 for variable rds_quali.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, the method steps provided here may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for conditioning a radio data signal for a broadcast receiver, the method comprising:
   reading in the radio data signal and a radio data clock signal;
   integrating a signal that is a function of at least one of the radio data signal and the radio data clock signal, to determine an integral value curve;
   decoding radio data signal information from the integral value curve, using at least one of the radio data clock signal and a phase position of the radio data signal;
   ascertaining radio data signal quality information which represents radio data signal quality, using at least one of the radio data signal and the phase position of the radio data signal, the radio data signal quality information representing the credibility of the decoded radio data signal information; and
   providing the radio data signal information and the radio data signal quality information to output a conditioned radio data signal from the broadcast receiver;
   wherein the phase position of the radio data signal is divided into a first phase having a phase angle of 0°, and a second phase having a phase angle of 180°, in the decoding, and wherein the first phase and the second phase are differentiated by applying a signum function to the radio data clock signal.

2. The method as recited in claim 1, wherein in the integrating, at least one of: i) an integral value over the duration of a period of the radio data clock signal is determined, and ii) an integral value is determined by multiplying the radio data signal by the sine of the radio data signal.

3. The method as recited in claim 1, wherein in the ascertaining, at least one of: i) the radio data signal quality information represents a good quality when an integral value of the radio data signal is below a predefined threshold value, and ii) the radio data signal quality information represents a poor quality when the integral value of the radio data signal is above the predefined threshold value, a good quality representing a high credibility, at least one of: the radio data signal quality information has a value of zero when it represents a good quality, and ii) the radio data signal quality information has a value of one when it represents a poor quality.

4. The method as recited in claim 1, wherein the radio data clock signal is obtained in the reading in by applying a Costas loop to the radio data signal.

5. The method as recited in claim 1, wherein a multiplex signal is read in in the reading in, a 19-kHz pilot tone being reconstructed using the multiplex signal, using a 19-kHz phase-locked loop, a 57-kHz wave being generated in response to the 19-kHz pilot tone, and the 57-kHz wave being mixed with the multiplex signal and converted into a baseband in order to provide the radio data signal.

6. The method as recited in claim 5, wherein at least one of: i) the radio data signal is filtered in the reading in, using a low pass filter, before the radio data signal is provided, and ii) subsampling with a predefined sampling factor takes place in a subtask sub step.

7. A device for conditioning a radio data signal for a broadcast receiver, comprising:
   a conditioning unit having a processor, and
   a non-transitory computer-readable storage medium storing a computer program, which is executable by a processor, including:
      a program code arrangement having program code for conditioning a radio data signal for a broadcast receiver, by performing the following:
      reading in the radio data signal and a radio data clock signal;
      integrating a signal that is a function of at least one of the radio data signal and the radio data clock signal, to determine an integral value curve;
      decoding radio data signal information from the integral value curve, using at least one of the radio data clock signal and a phase position of the radio data signal;
      ascertaining radio data signal quality information which represents radio data signal quality, using at least one of the radio data signal and the phase position of the radio data signal, the radio data signal quality information representing the credibility of the decoded radio data signal information; and
      providing the radio data signal information and the radio data signal quality information to output a conditioned radio data signal from the broadcast receiver;
      wherein the phase position of the radio data signal is divided into a first phase having a phase angle of 0°, and a second phase having a phase angle of 180°, in the decoding, and wherein the first phase and the second phase are differentiated by applying a signum function to the radio data clock signal.

8. A non-transitory computer-readable storage medium storing a computer program, which is executable by a processor, comprising:
   a program code arrangement having including program code for conditioning a radio data signal for a broadcast receiver, by performing the following:
   reading in the radio data signal and a radio data clock signal;
   integrating a signal that is a function of at least one of the radio data signal and the radio data clock signal, to determine an integral value curve;
   decoding radio data signal information from the integral value curve, using at least one of the radio data clock signal and a phase position of the radio data signal;

ascertaining radio data signal quality information which represents radio data signal quality, using at least one of the radio data signal and the phase position of the radio data signal, the radio data signal quality information representing the credibility of the decoded radio data signal information; and providing the radio data signal information and the radio data signal quality information to output a conditioned radio data signal from the broadcast receiver;

wherein the phase position of the radio data signal is divided into a first phase having a phase angle of 0°, and a second phase having a phase angle of 180°, in the decoding, and wherein the first phase and the second phase are differentiated by applying a signum function to the radio data clock signal.

\* \* \* \* \*